US012045273B1

(12) United States Patent
Morriss

(10) Patent No.: US 12,045,273 B1
(45) Date of Patent: Jul. 23, 2024

(54) ERROR AND MANIPULATION RESISTANT SEARCH TECHNOLOGY

(71) Applicant: William S. Morriss, Cincinnati, OH (US)

(72) Inventor: William S. Morriss, Cincinnati, OH (US)

( * ) Notice: Subject to any disclaimer, the term of this patent is extended or adjusted under 35 U.S.C. 154(b) by 573 days.

(21) Appl. No.: 16/886,986

(22) Filed: May 29, 2020

Related U.S. Application Data

(63) Continuation of application No. 16/554,714, filed on Aug. 29, 2019, now Pat. No. 10,706,092, which is a continuation-in-part of application No. 14/444,413, filed on Jul. 28, 2014, now abandoned.

(60) Provisional application No. 61/913,322, filed on Dec. 8, 2013, provisional application No. 61/859,288, filed on Jul. 28, 2013.

(51) Int. Cl.
| | |
|---|---|
| *G06F 16/35* | (2019.01) |
| *G06F 16/36* | (2019.01) |
| *G06F 16/38* | (2019.01) |
| *G06F 16/9538* | (2019.01) |
| *G06F 40/295* | (2020.01) |
| *G06F 40/30* | (2020.01) |

(52) U.S. Cl.
CPC .......... *G06F 16/355* (2019.01); *G06F 16/367* (2019.01); *G06F 16/382* (2019.01); *G06F 16/9538* (2019.01); *G06F 40/295* (2020.01); *G06F 40/30* (2020.01)

(58) Field of Classification Search
CPC ... G06F 16/355; G06F 16/382; G06F 16/9538
See application file for complete search history.

(56) References Cited

U.S. PATENT DOCUMENTS

| | | | | |
|---|---|---|---|---|
| 7,529,756 | B1* | 5/2009 | Haschart | G06F 16/93 |
| 2013/0346402 | A1* | 12/2013 | Stavrianou | G06Q 10/06 |
| | | | | 707/723 |
| 2015/0032728 | A1* | 1/2015 | Rozich | G06F 16/93 |
| | | | | 707/722 |

OTHER PUBLICATIONS

Chen et al. ("Trailblazing through a Knowledge Space of Science: Forward Citation Expansion in CiteSeer", published Oct. 2007 in Proceedings of the American Society for Information Science and Technology, vol. 43, Issue 1, pp. 1-7) (Year: 2007).*

* cited by examiner

*Primary Examiner* — Charles D Adams
(74) *Attorney, Agent, or Firm* — Frost Brown Todd LLP

(57) ABSTRACT

Search may be provided using a database storing a plurality of documents comprising a first set of documents and a second set of documents, a set of vetting values and a computer readable medium. In such a system, for each document in the second set of documents, the first set of documents comprises a document for which that document from the second set of documents is identified as a subsequent related document. Additionally, the set of vetting values may comprise, for each document from the second set of documents, a vetting value for the document from the first set of documents for which that document from the second set of documents is identified as the subsequent related document. Additionally, the medium may store instructions to respond to a query by determining, based on the set of vetting values, a search result set comprising documents from the first set of documents.

14 Claims, 6 Drawing Sheets

ERROR AND MANIPULATION RESISTANT SEARCH TECHNOLOGY

CROSS REFERENCE TO RELATED APPLICATIONS

This is a continuation of, and claims the benefit of, U.S. non-provisional patent application Ser. No. 16/554,714, filed on Aug. 29, 2019, which is itself a continuation in part of U.S. non-provisional patent application Ser. No. 14/444,413, filed on Jul. 28, 2014, which is itself a non-provisional of provisional patent application 61/913,322, filed on Dec. 8, 2013, and of provisional patent application 61/859,288, filed on Jul. 28, 2013. U.S. non-provisional patent application Ser. No. 16/554,714 is hereby incorporated by reference in its entirety.

FIELD

The technology disclosed herein can be applied in identifying information which may be relevant to input provided by a user.

BACKGROUND

The modern Internet is built on the back of search. The dynamic, decentralized nature of online content creation means that there is a virtually infinite and ever growing amount of information available. However, this information has no value in the absence of some at least moderately effective mechanism for identifying material that is likely to be relevant for a particular context. Moreover, such a mechanism must provide a technological solution, since information management solutions from the pre-Internet world (e.g., relying on subject matter experts to categorize new content into a predefined ontology) are ill equipped to address the dynamicism and decentralization that are the hallmarks of online content creation. Thus far, the only mechanism that has proved viable has been search. Indeed, even social media platforms such as Facebook and Twitter can be considered search companies, as the task of identifying relevant content for populating a user's feed is fundamentally similar to the task of identifying relevant content to use in populating a traditional search result page.

Despite the foundational role of search, the technology has many flaws. For example, the very efficacy of search has resulted in search algorithms effectively becoming gatekeepers for information, providing incentives for people or organizations who wish to manipulate opinion for financial or other gains to actively subvert them (e.g., link farming, fake news). Similarly, the fact that search technology is expected to identify relevant information from as broad a swath of results as possible means that items which could be provided as search results may include errors that could decrease the accuracy or perceived accuracy of results which will be provided to users. Accordingly, there exists a need for improvements that address or improve on one or more of the flaws in currently used search technology.

SUMMARY

There is a need for improvements in search technology. In may thus be an object of some embodiments to provide systems for providing such improvements. In a first aspect such a system may comprise a database, a set of vetting values, and a non-transitory computer readable medium storing instructions to respond to a query. In some such systems, the database may store a plurality of documents comprising a first set of documents and a second set of documents. In some such systems, for each document in the second set of documents, the first set of documents may comprise a document for which that document from the second set of documents is identified as a subsequent related document. In some such systems, the set of vetting values may comprise, for each document from the second set of documents, a vetting value for the document from the first set of documents for which that document from the second set of documents is identified as the subsequent related document. In some such systems, the instructions on the computer readable medium may be operable to, when executed, respond to a query by determining, based on the set of vetting values, a search result set comprising documents from the first set of documents. In some such systems, the search result set may not comprise any documents from the second set of documents (and, indeed, the instructions may be configured such that only documents from the first set of documents could even potentially be included in any result set).

In a second aspect, in some systems such as described in the context of the first aspect, the plurality of documents may comprise a third set of documents, and the search result set may not comprise any documents from the third set of documents. In some such embodiments, the third set of documents may comprise, for each document in the first set of documents, a document identified as a preceding related document for that document from the first set of documents.

In a third aspect, in some systems such as described in the context of the second aspect, the non-transitory computer readable medium may store instructions to generate the set of vetting values based on, for each document from the second set of documents, a) a set of semantic items corresponding to that document; and b) a set of semantic items corresponding to the document from the third set of documents identified as the preceding related document from the document from the first set of documents for which that document from the second set of documents is identified as the subsequent related document.

In a fourth aspect, in some systems such as described in the context of the third aspect, the non-transitory computer readable medium may store instructions to: a) for each document from the second set of documents, identify the set of semantic items for that document by performing steps comprising identifying a set of topics for that document; and b) for each document from the third set of documents, identify the set of semantic items for that document by performing steps comprising identifying a set of topics for that document.

In a fifth aspect, in some systems such as described in the context of the fourth aspect, the non-transitory computer readable medium may store instructions to receive a specified topic, and determine the search result set to only include documents for which the set of topics for the document identified as the preceding related document includes the specified topic.

In a sixth aspect, in some systems such as described in the context of the fifth aspect, the non-transitory computer readable medium may store instructions to define the specified topic based on a user uploading an input document via a user interface, and identifying the specified topic as a topic for the input document.

In a seventh aspect, in some systems such as described in the context of the fourth aspect, the non-transitory computer readable medium may store instructions to, for each document from the first set of documents for which a document from the second set of documents is identified as a subsequent related document performing one or more additional steps. In some such embodiments, the one or more additional steps may comprise, for each topic for the document from the third set of documents identified as the preceding related document for that document from the first set of documents, generating a vetting value for that topic and that document from the first set of documents based on comparing a first subset of semantic items with a second subset of semantic items. In such an embodiment, the first subset of semantic items may comprise semantic items from the set of semantic items corresponding to the document from the third set of documents identified as the preceding related document for that document from the first set of documents, the second subset of semantic items may comprise semantic items from the set of semantic items corresponding to the document from the second subset of documents identified as the subsequent related document for that document from the first set of documents, and all semantic items comprise by the first and second subsets of semantic items may be associated with that topic.

In an eighth aspect, in some systems such as described in the context of the first aspect, the non-transitory computer readable medium may store instructions to present a search result interface. In some such embodiments, the search result interface may be operable by a user to access one or more documents from the search result set. In some such embodiments, for each document from the search result set accessible by the user via the search result interface, the search result interface makes documents identified as related documents for that document from the search result set accessible by the user.

In a ninth aspect, in some systems such as described in the context of the eighth aspect, the search result interface may make documents identified as related documents accessible by the user by: a) providing, for each document from the search result set accessible by the user via the search result interface, a link to a list of related documents for that document from the search result set; and b) responding to activation of the link to the list of related documents for a document from the search result set by providing a page comprising links to the documents identified as related documents for that document from the search result set.

In a tenth aspect, in some systems such as described in the context of the first aspect, the non-transitory computer readable medium may store instructions to present a search result interface wherein the search result interface comprises a tool operable to submit a request to filter the search result set based on the set of vetting values. In some such embodiments, the non-transitory computer readable medium may store instructions operable to, in response to a request to filter the search result set based on the set of vetting values, present a result list of documents from the search result set that are both filtered and sorted based on the set of vetting values.

In an eleventh aspect, in some systems such as described in the context of the fourth aspect, for each document from the second set of documents, the document from the first set of documents for which that document from the second set of documents is identified as the subsequent related document may be associated with a first viewpoint. In some such embodiments, for each document from the second set of documents, that document from the second set of documents may be associated with a second viewpoint. In some such embodiments, for each document from the second set of documents, the document from the third set of documents identified as the preceding related document for the document from the first set of documents for which that document from the second set of documents is identified as the subsequent related document may be associated with a third viewpoint. In some such embodiments, the first and second viewpoints may be contrasting viewpoints for a subject topic. In some such embodiments, the second and third viewpoints may not be contrasting viewpoints for the subject topic.

In a twelfth aspect, in some systems such as described in the context of the eleventh aspect, for each document from the second set of documents, the set of topics identified for that document, and the set of topics identified for the document from the third set of documents identified as the preceding related document for the document from the first set of documents for which that document from the second set of documents is identified as the subsequent related document, may both comprise the subject topic. In some such embodiments, for each document from the second set of documents, the instructions to generate the set of vetting values may be configured to generate a vetting value corresponding to the subject topic for the document from the first set of documents for which that document from the second set of documents is identified as the subsequent related document based on a difference in sentiment associated with the subject topic between: (i) that document from the second set of documents, and (ii) the document from the third set of documents identified as the preceding related document for the document from the first set of documents for which that document from the second set of documents is identified as the subsequent related document.

In a thirteenth aspect, in some systems such as described in the context of the eleventh aspect, the subject topic may be from an ontology of controversial topics.

In a fourteenth aspect, in some systems such as described in the context of the eleventh aspect, the first viewpoint, the second viewpoint, and the third viewpoint may all be from an ontology of political viewpoints.

In a fifteenth aspect, in some systems such as described in the context of the eleventh aspect, the second viewpoint may be the same as the third viewpoint.

In an sixteenth aspect, in some systems such as described in the context of the sixth aspect, the input document and each document from the third set of documents may be an office action from the U.S. patent and trademark office. In some such embodiments, for each document from the third set of documents, the set of topics for that document may be a set of rejection types included in that document. In some such embodiments, the specified topic may be a rejection type.

In a seventeenth aspect, in some systems such as described in the context of the sixteenth aspect, the second set of documents may comprise one or more documents that are office actions from the U.S. patent and trademark office, or notices of allowance from the U.S. patent and trademark office.

In an eighteenth aspect, in some systems such as described in the context of the seventh aspect, each document from the third set of documents may be an office actin from the U.S. patent and trademark office. In some such embodiments, for each document from the third set of documents, the set of topics for that document may be a set of rejection types included in that document. In some such embodiments, for each document from the first set of documents for which a document from the second set of documents is identified as a subsequent related document, for each topic for the document from the third set of documents identified as the previous related document for that document from the first set of documents, that topic may be a rejection type and each semantic item from the first subset of semantic items is a rejection of a claim using the rejection type of that topic.

In a nineteenth aspect, in some systems such as described in the context of the eighteenth aspect, for each document from the first set of documents for which a document from the second set of documents is identified as a subsequent related document, for each topic for the document from the third set of documents identified as the previous related document for that document from the first set of documents, generating the vetting value for that topic and that document from the first set of documents based on comparing the first subset of semantic items with the second subset of semantic items. In some such embodiments, this comparison may comprise determining that that document from the first set of documents is at least partially vetted for that topic based on at least one of the claims rejected using the rejection type of that topic in the document from the third set of documents identified as the previous related document for that document from the first set of documents not being removed from prosecution and not being also rejected using the rejection type of that topic in the document from the second set of documents identified as the subsequent related communication for that topic from the first set of documents.

Corresponding methods and non-transitory computer readable medium storing instructions for performing such methods are also possible, as are further variations on the technology described herein. Accordingly, the preceding description of potential embodiments and aspects should be understood as being illustrative only, and should not be treated as limiting.

DESCRIPTION OF THE DRAWINGS

The drawings and detailed description which follow are intended to be merely illustrative and are not intended to limit the scope of the protection provided by this or any related document.

FIG. 6 depicts a process that could be used to determine what (if any) topics an included communication should be treated as having been vetted for.

DETAILED DESCRIPTION

This disclosure describes approaches that can be used to improve on current search technologies, as well as certain contexts in which those approaches may be applied. While this disclosure focuses on the application of its technology in the context of combatting "fake news" and other types of intentional manipulation, it should be understood that the techniques disclosed herein are applicable in other contexts as well, and that the examples provided herein are intended to be illustrative only, rather than limiting. Accordingly, this disclosure should not be treated as implying limits on the protection provided by this document or any other document that claims the benefit of this disclosure.

Figure 1:
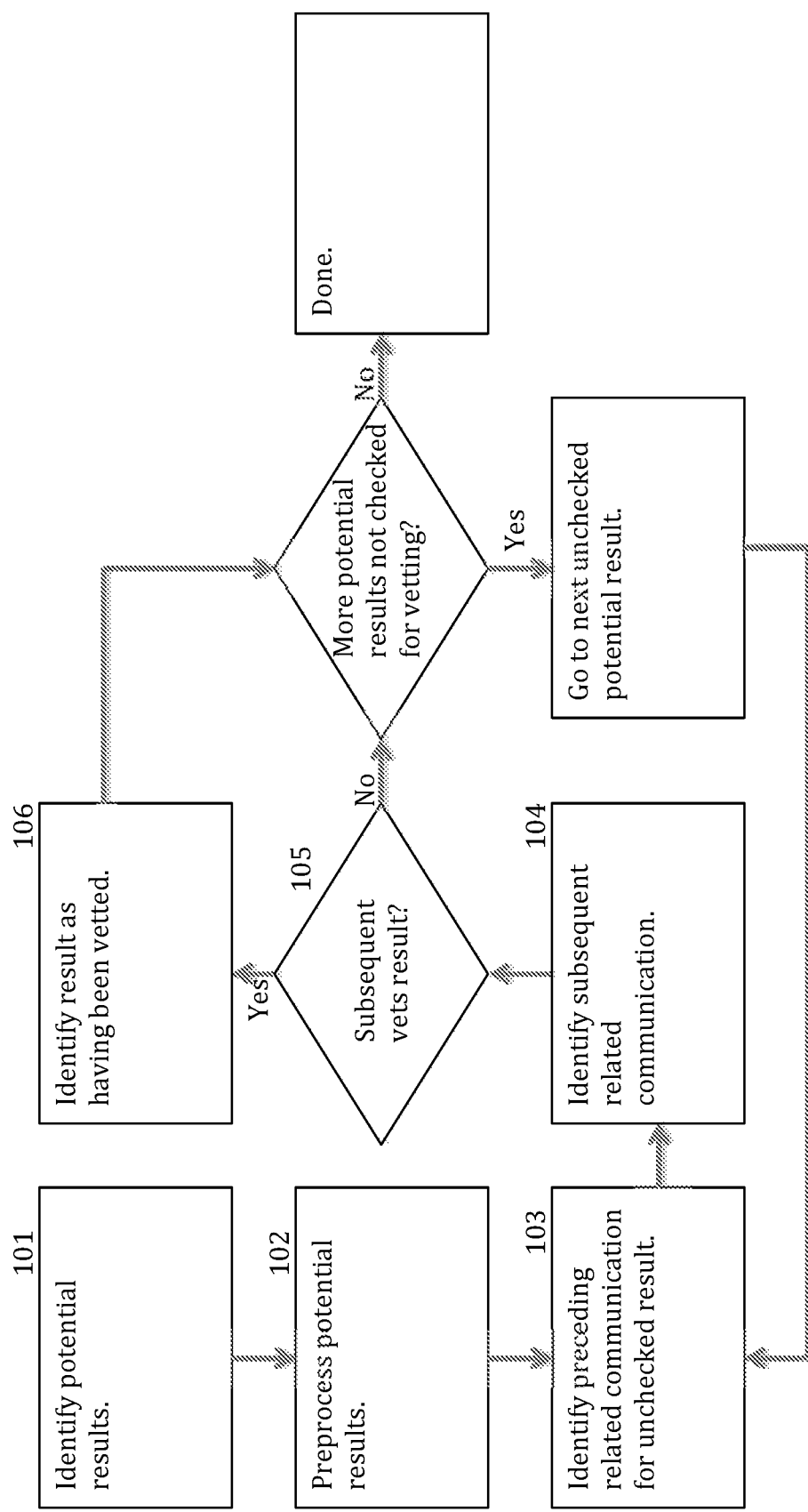
FIG. 1 depicts a process which can be used to address search manipulation.

Turning now to FIG. 1, that figure illustrates a process which can be used to address search manipulation by treating potential search results as portions of communication streams. Initially, in the process of FIG. 1, a plurality of potential results are identified 101. This can be done, for example, using a web crawler or similar automated process to find content which may later be served as being of interest and either storing copies of that content in a database or storing some type of reference to where that content can be found on an external site.

After the potential search results are identified 101, each of those results is subjected to pre-processing 102 to extract information that may be useful in determining whether it should be included in subsequent search results. For example, in some embodiments where this type of pre-processing 102 is performed, it may be implemented in the form of a multi-step process for identifying and associating topics and salient features. To illustrate, consider the example of pre-processing commentary regarding controversial political issues. Initially, the topic(s) addressed by the commentary could be identified, such as by identifying keywords and associating them with topics from a preexisting ontology of controversial topics, and/or by using Dirichlet clustering, Bayesian analysis, or other topic analysis such as described in Timothy Hazen, *Topic Identification*, available at https://pdfs.semanticscholar.org/0f75/1f6e125c9d758afcb204f2a0dca68d8232e2.pdf, which is hereby incorporated by reference in its entirety.

Next, salient features in the commentary could be identified, such as by using named entity recognition to identify items likely to be used in support of the commentary's conclusion, such as statistics, places and people. Finally, those salient features could be connected to the topics they are most likely included in reference to. This can be done using structural analysis (e.g., if the commentary is organized into topics, then salient features which appear under the "immigration" heading may be connected to the "immigration" topic), semantic analysis (e.g., if a salient feature appears in a statement that includes both a topic and a connecting word such as "because" which indicates that the salient feature is used in support of a conclusion on the topic, the salient feature may be connected to the topic), or other types of analysis which may be appropriate for a particular application of disclosed technology (e.g., statistical analysis, such as considering whether, based on a large corpus of previously processed items, a particular salient feature is highly correlated with a particular topic).

Next, for each of the potential results, at least one preceding related communication is identified 103. In some cases, this may be a straightforward matter of simply analyzing the context in which a potential result appears. For example, if a potential result is a comment posted in response to an article on a social media website, then the article may be (but in some embodiments may not necessarily be) identified as the preceding communication. However, in some embodiments the identification 103 of preceding related communications may involve additional processing. For example, consider the case of a potential result in the form of a piece of original commentary or reporting. In this case, even if the potential result does not explicitly respond to some other piece of content, some embodiments may identify other material which can be treated as preceding communications by analyzing the content of the potential result and comparing it with other items that it may be responding to semantically, if not literally.

To illustrate, consider potential embodiments of the disclosed technology used to identify and reduce the impact of manipulation related to controversial political issues. In such embodiments, identifying 103 a preceding related communication may begin by identifying other documents (e.g., other articles, blog posts, etc.) which share a topic with the potential result and treating them as candidate related communications. Then, to avoid echo chamber scenarios or other circumstances in which a potential result is effectively a restatement of the candidate related communication, the viewpoints of the documents can be identified and compared. This can be done, for example, by creating a social graph of the communication's authors (or sources in the case of anonymous contributions) and determining if that graph indicated that the authors were more closely aligned with opposing sides of the political spectrum, by examining explicit markers of affiliation such as voter registration and/or political donation databases, etc. Then, if the viewpoints are contrasting, then the candidate related communication can be identified 103 as a preceding related communication for the potential result. For instance, if a potential result is a piece of original commentary arguing that immigration should be restricted, an entirely separate piece of original commentary (preferably, though not necessarily, dated before the potential result) arguing that immigration should be encouraged could be identified 103 as a preceding related communication even if there was no explicit link between the two. As another example, in some embodiments, viewpoints may be mapped to an ontology of pre-existing political viewpoints (e.g., two axis Nolan chart political spectrum) and whether they are contrasting could be determined by considering the position of the viewpoints in that ontology relative to the topic shared with the potential result (e.g., viewpoints on the economic left portion of a Nolan chart would be likely to contrast with viewpoints on the economic right portion of the Nolan chart with respect to the topic of the minimum wage).

However it takes place, in the process of FIG. 1, after a preceding related communication has been identified 103, a step of identifying 104 a subsequent related communication may be performed. As with the identification 103 of a preceding related communication, in some instances the identification 104 of a subsequent related communication could be performed trivially based on context. For example, if a potential result is a comment on a social media website, then in some embodiments subsequent related communications may be identified by looking at replies to the comment. Similarly, if a document is found which explicitly refers to a potential result (e.g., by including a link, referring to it by author and title, etc.), then, in some embodiments, that document could automatically be identified 104 as a subsequent related communication. However, it should be understood that, as with identification 103 of a preceding related communication, the disclosed technology can also be used to implement systems which are capable of identifying 104 subsequent related communications even in the absence of an explicit link to a potential result. A discussion of how this may take place is set forth below in the context of FIG. 2.

Figure 2:
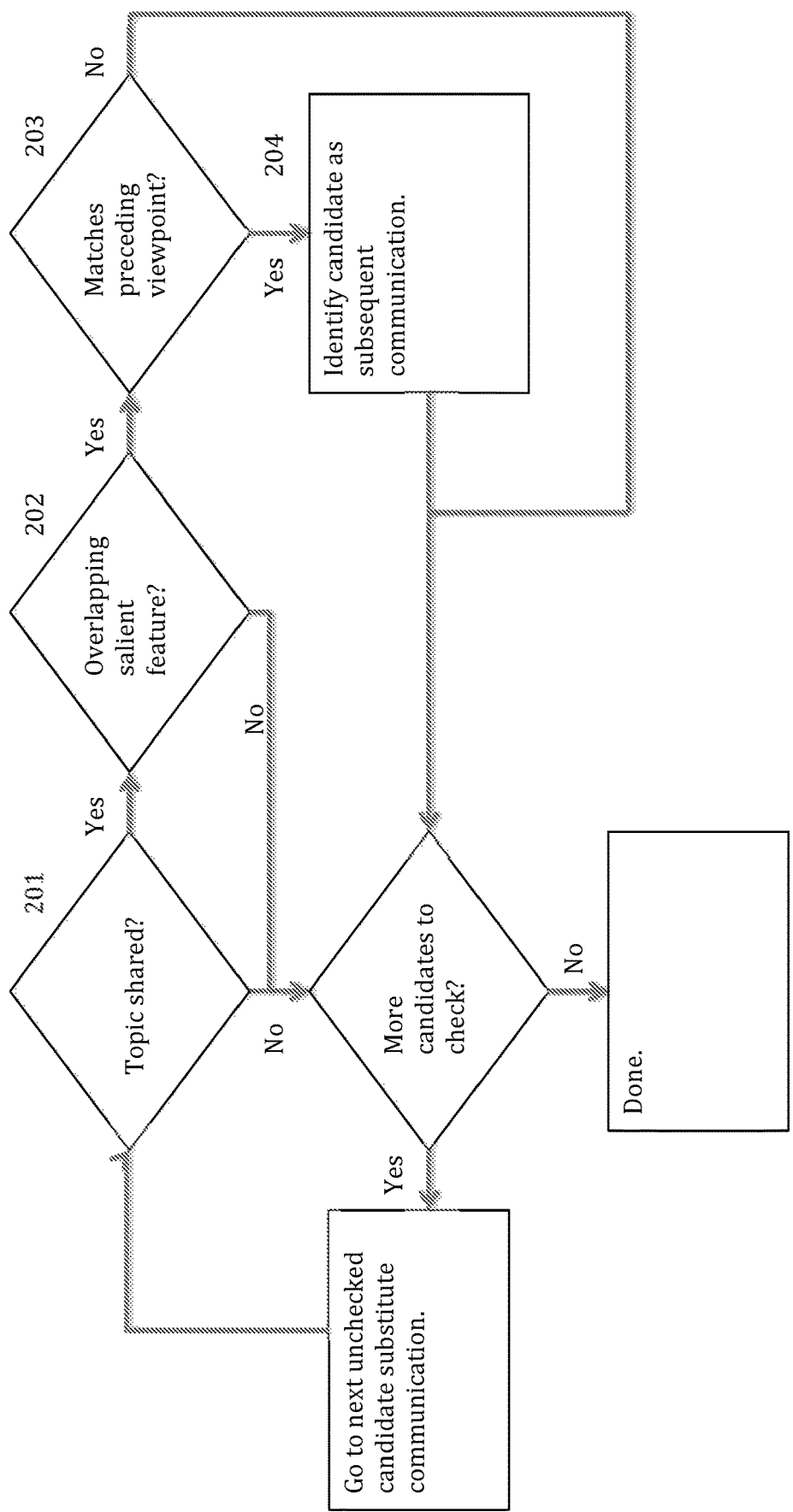
FIG. 2 depicts a semantic connection identification process.

FIG. 2 illustrates a semantic connection identification process that, in some embodiments, may be used to identify 104 subsequent related communications even in the absence of an explicit link to a potential result. As shown in FIG. 2, a semantic connection identification process could, for each of a plurality of candidate subsequent related communications, check 201 if the potential result and that candidate subsequent communication share at least one topic (e.g., using topic identification algorithms such as described previously in the context of identifying preceding related communications, either on the entire candidate subsequent communication, or on individual sections of that communication, such as paragraphs). If there was not at least one shared topic, then that candidate subsequent communication could be discarded as not suitable as being treated as a subsequent related communication. Alternatively, if there is a common topic, a process such as shown in FIG. 2 could continue by checking, for each shared topic, 202 if both the potential result and the candidate related communication included some salient feature which was both associated with that topic and unusual (e.g., as shown by its probability of co-occurrence with the relevant topic being below some threshold value) in that context (e.g., because it related to some recent event which had not yet had a chance to propagate widely among the interested public). In this way, it could be determined if the candidate communication was closely enough related, at least semantically, that the candidate subsequent related communication could be treated as responding to the potential result.

However, as shown in FIG. 2, preferably even after determining that a candidate subsequent related communication had both a common topic with a potential result and treated that topic in a manner which is similar enough to that in the potential result (either based on sharing uncommon salient features as described above, or in some other manner) to be treated as linked to it, a further check will be made to avoid something being treated as a subsequent related communication simply because it echoes (and therefore adds little or nothing to) the candidate result. This may be done by, for each topic where the potential result and candidate related communication were linked, checking 203 if the candidate related communication was from a source which was aligned with a preceding related communication having a contrasting viewpoint on that topic (e.g., because the preceding related communication and candidate subsequent related communication had the same author, or were from a source which had been found to have a consistent viewpoint in the materials it presented). If it was, then the candidate related communication could reasonably be expected not to simply echo the candidate result, and so could be identified 204 as being suitable for treatment as a subsequent related communication, even if only for purposes of that particular topic.

Returning to the process of FIG. 1, once or more subsequent related communications had been identified 104, a check 105 can be performed to determine if those communications should be treated as having vetted the potential result. This can be done by, for each subsequent related communication looking at each topic for which that document was treated as a subsequent related communication, and analyzing the subsequent related communication's sentiment (e.g., using methods such as described in U.S. Pat. No. 7,996,210 to Godbole et al. for "Large-scale sentiment analysis" or U.S. Pat. No. 9,201,863 to Minh Duong-Van for "Sentiment analysis from social media content," the disclosures of each of which are hereby incorporated by reference in their entireties) to determine if it appeared to agree with (or at least be positively disposed to) the potential result on that topic. Finally, if the subsequent related communication did agree with (or at least was positively disposed to) the potential result, then a system implementing a process such as shown in FIG. 1 could identify 106 that potential result as having been (effectively) vetted by someone having an opposing viewpoint (e.g., by storing a reference to that potential result in an index showing items which had been vetted for the relevant subject, and therefore were less likely to be incorrect). Then, when a subsequent search was made for items related to the potential result's topic, that item could be given more weight when determining the results, thereby making it less likely that the user would be exposed to (e.g., because he or she accessed the top items in a search engine result list, or because the items were presented to a user in his or her feed by a social media service) fake news or other types of misinformation.

In practice, after some subset of a corpus of potential results has been identified as having been vetted using a process such as described above in the context of FIGS. 1 and 2, the vetting identifications can be applied to reduce the impact of manipulation and/or errors (which may be intentional or inadvertent) on a user's search results. For example, if an individual enters an input string into a traditional search engine interface, results based on that input string can initially be generated using preexisting techniques (e.g., generating a set of document links based on queries generated by matching the input string against search indices), but then before being presented to the user those results can be modified based on the vetting information (e.g., results which are identified as having been vetted can be upweighted in the user's ultimate result list, results that were not identified as having been vetted can be filtered out, etc.). Similarly, if a social media site was determining how to populate a user's feed, vetting information such as could be determined using a method like that of FIG. 1 could be used to upweight potential feed items (or filter out unvetted potential feed items) so that the user would be less likely to be exposed to "fake news" or other erroneous or manipulative information.

Of course, it should be noted that the disclosed technology is not limited to being applied to enhancing the effectiveness of existing approaches to search and social media feed population. To illustrate, consider the case of a person trying to evaluate the reliability of an article that he or she had recently encountered. To facilitate this type of activity, it is possible that the disclosed technology could be used to build a database for a website which would allow users to specify entire documents (e.g., by uploading them, or by providing URLs or other references to them) and then provide information specifically focused on allowing the user to evaluate the input document's reliability. In some embodiments, this might be done by checking if the input document was already in the website's database of vetted results (e.g., by comparing a hash for the input document with hashes for the vetted results) and, if it was, providing the user with the subsequent communication(s) that had been identified as vetting the input document so that he or she could make an independent determination of the subsequent communication(s)'s salience and impact on the input document's credibility. Alternatively (or as a fallback in cases where an input document had not already been evaluated), in some embodiments of this type, an input document may be compared to previously vetted results on a semantic level (e.g., by matching salient features and subjects such as could be identified using the techniques described previously in the context of pre-processing 102), and providing a result list including related communication(s) which had been identified as vetting documents which, while not the same as the input document, were similar enough that the user would likely find them to be useful in evaluating the input document's reliability. As yet another alternative, a system implemented to utilize a database of vetted potential results such as described above could be implemented to simply give a quick indication of whether a particular input document appeared to be reliable—e.g., a statement that it had or had not been vetted or, if the input document addressed multiple issues, a statement indicating which of those multiple issues it had been vetted on.

Other types of document analysis/reporting systems could be implemented based on this disclosure, and so the above description should be understood as being illustrative only, rather than being treated as limiting. For example, in some embodiments, rather than (or in addition to) identifying whether a potential result should be treated as having been vetted, a system implemented based on this disclosure could identify if a potential result had failed to be vetted, or had even been refuted. This could be done, for instance, by checking if a subsequent communication having the same viewpoint as a preceding communication had a negative sentiment to a potential result on a matching issue (indicating that the potential result had failed to be vetted), or if a subsequent communication having a viewpoint matching the potential result had a negative sentiment to the potential result, or a positive sentiment to a preceding communication with the opposite viewpoint (indicating that the potential result had been refuted). In embodiments which included compilations of this type of information, uploading an input document might result in the user being presented with results refuting the input document, rather than vetting it. Alternatively, multiple types of results may be presented—e.g., in a column view where results appearing to establish the reliability of the input document (e.g., subsequent communications which could be treated as vetting the input document or a similar document) would be presented in contrast to results appearing to undercut that reliability (e.g., subsequent communications which could be treated as refuting the input document or a similar document).

As another example of a variation on how document analysis/reporting could be implemented based on this disclosure, in some cases, aspects of the disclosed technology could be used to implement a system which would proactively alert a user when he or she might be unknowingly propagating misleading or erroneous information. For instance, in the social media context, when an individual was planning on posting or sharing an article, that article could be compared against a database of results which had previously been identified as having been vetted (or refuted) and the individual could be notified if the article he or she was going to post (or share) appeared to be unreliable (e.g., because it appeared to have been refuted). In a similar manner, some embodiments of the disclosed technology may assist users who want to make a point make it in a more persuasive manner. For example, if a user was posting an article that appeared to be unreliable, some embodiments might identify other articles that had been vetted and that addressed the same topic and from the same viewpoint as the article the user was uploading, and could suggest to the user that he or she post one of those articles, rather than the one he or she had originally intended to post. Similarly, in some embodiments, if a user was looking for an article that would refute something he or she had found online, that user could be allowed to upload a copy of the article he or she wanted to refute, and would be provided with a list of results with viewpoints opposing that of the uploaded document and that had been identified as vetted using a process such as shown in FIG. 1. Such an embodiment might also allow the user to view the preceding and subsequent related communications for the results so that he or she could verify both their level of vetting and their applicability to his or her situation.

As another example of a potential type of variation that may be present, in some embodiments, whether a particular result is vetted may be treated as a percentage or likelihood, rather than a binary determination. For example, in some embodiments, a process such as shown in FIG. 1 could be used to determine if individual subsequent communications should be treated as vetting individual potential results, and the potential result could be given a percentage reliability score based on the number of subsequent communications that indicated the result was reliable versus the number of subsequent communications that indicated it was not. Similarly, in some embodiments, these types of scores may be generated based on combining information for multiple potential results. For example, potential results could be grouped based on whether they shared salient features, or on whether they should be treated as near matches using approaches such as described in U.S. Pat. No. 7,707,157 filed on Mar. 25, 2004 for document near-duplicate detection, U.S. Pat. No. 8,140,505, filed on Mar. 31, 2005 for near-duplicate document detection for web crawling, Monika Henzinger, Finding Near-Duplicate Web Pages: A Large Scale Evaluation of Algorithms, available at http://citeseerx.ist.psu.edu/viewdoc/download?doi=10.1.1.600.3907&rep=rep1&type=pdf, and/or Manku et al., Detecting Near-Duplicates for Web Crawling, available at https://www2007.org/papers/paper215.pdf, the disclosures of each of which are hereby incorporated by reference in their entirety, and percentage reliability scores could be generated for entire groups using the frequency at which documents in those groups were treated as (un)reliable. Of course, combinations (e.g., embodiments in which reliability/unreliability would be determined on a percentage basis, and then an individual result would be treated as having been vetted or unvetted on a binary basis based on whether a reliability score was above a threshold value) are also possible, and so the description above should be understood as being illustrative only, and should not be treated as limiting.

It is also possible that, in some implementations, multiple topics may be considered in determining whether (and/or to what extent) a particular result should be treated as vetted. To illustrate, consider the case of determining whether an article advocating for open borders should be treated as having been vetted by an article by another author who had advocated for closed borders in a preceding communication. In such a case, if a subsequent article by the author who had previously advocated for closed borders showed that that author had changed his or her mind and now supported open borders, this could be treated as fully vetting the article advocating for open borders. However, if a subsequent communication by the author who had previously advocated for closed border showed that that author now accepted an intermediate position (e.g., allowing limited legal immigration rather than completely open or closed borders), this could be treated as partially vetting the potential result (e.g., giving it a vetting score of 0.5 rather than 1 for use in subsequent weighting of that result) rather than either fully vetting it or failing to vet it at all. To support this type of determination, some systems implemented based on this disclosure may maintain data showing relationships between topics that could be used to determine when transitions between positions should be treated as partially vetting potential results. Where this type of data is present, it may take various forms, such as rules (e.g., a set of IF/THEN statements indicating partial vetting values that should be inferred from various topic shifts), ontologies (e.g., hierarchies of positions on various topics organized in terms of extremism that could be used to identify when a potential result should be treated as partially vetted based on a transition in a subsequent communication to a less extreme position than was taken in a preceding communication), and/or combinations of those types of approaches.

Similarly, in some embodiments, multiple semantic items associated with a single topic could potentially be considered. For example, consider a case of determining whether an article advocating loosening of abortion regulations should be treated as vetted. If a subsequent related communication was identified that included two arguments for restricting abortion—e.g., that it ended a human life, and that it was a religious sin, those arguments could be considered as individual semantic items both relating to the topic of abortion when determining if the article should be treated as having been vetted. For instance, if the article addressed both of those arguments, and the subsequent related communication only included one of them (or indicated it agreed with the article on one of them), then, in some embodiments, the article could be treated as having been partially or wholly vetted on the subject of abortion restrictions even though the subsequent related communication indicated that the article was persuasive on one of the original arguments.

As another example of a potential variation that may be present in some embodiments, it is also possible that aspects of the disclosed technology could allow a user to exercise some degree of control over his or her results while still protecting him or her from manipulative or erroneous documents. To illustrate, consider an embodiment in which a user is allowed to upload (or otherwise specify) a document and will be presented with results showing other documents responding to the arguments presented in the uploaded document. In this type of embodiment, in addition to simply presenting the user with the results, a user may also be provided with tools that he or she could use to focus the results to be as meaningful as possible to him or her. For example, in some embodiments, the user could be presented with tools (e.g., buttons, drop down menus, check boxes, or similar input forms) that he or she could use to indicate that the results should be filtered based on one or more of the following features:

author of result;
source of result (e.g., the publication, website or other channel from which the result was obtained);
author of subsequent related communication;
source of subsequent related communication;
author of preceding related communication;
source of preceding related communication;
text in the preceding related communication (e.g., only show results whose preceding related communications included specific user defined strings, or matched specific user defined search parameters);
text in result;
text in subsequent related communication (e.g., only show results whose subsequent related communications, if any, included specific user defined strings)
topic of result (e.g., if the uploaded document included arguments on multiple topics, select a specific one of those topics and ensure that all results responded to preceding related communications that also addressed that topic);
date of preceding related communication;
date of result;
related material for result (e.g., only include results that include links to authoritative sources, such as the bureau of labor statistics for a result dealing with unemployment); and/or
whether the result was vetted, refuted, or the user doesn't care.

In an embodiment where a user was allowed to specify parameters such as above, after the parameter(s) have been specified, they could be used to present a list of results that is customized for the particular user. For example, in some embodiments which support identification of levels of vetting, when a user specifies that he or she only wants to see results that have been vetted as successful for a particular topic, the result list could be filtered to only include documents that had at least some level of vetting, and the results themselves could be filtered based on the amount of vetting each one actually had (e.g., each result would have to have been vetted as successfully overcoming at least one argument on a topic, and the results could then be sorted based on their actual levels of vetting for that topic). It is also possible that, rather than using user specified parameters as filters, such parameters could be used to assign weights to potential results, such that the order in which results were presented would be modified, but the actual content of the result set would remain the same.

Other variations are also possible and will be immediately apparent to those of ordinary skill in the art in light of this disclosure. For example, in some embodiments, a user may be presented with an interface that allows him or her to specify parameters such as described above without requiring him or her to upload an input document or considering vetting values. For instance, in some embodiments, a user may be provided with an interface allowing him or her to specify parameters such as text that should appear in preceding related communications and/or text and should appear in subsequent related communications, and be provided with a result list that only included results matching whatever parameters the user specified. Accordingly, the above description of parameters that could be used to determine what (and how) results should be presented to a user should be understood as being illustrative only, and should not be treated as limiting.

Of course, it should be understood that, while the examples above focused primarily on applying the disclosed technology to limit or mitigate the impact of "fake news" or other deceptive or erroneous materials related to controversial social or political issues, the disclosed technology is not limited to being applied only in that context. To illustrate, consider the potential for applying the disclosed technology to iterative processes of written negotiation, such as prosecution of patent applications. To apply a process such as shown in FIG. 1 in the context of patent prosecution, the initial identification of potential results 101 could be performed by downloading a set of image file wrappers (e.g., from Google books https://www.google.com/googlebooks/uspto-patents-pair.html) and then identifying the office action responses, pre-appeal briefs, and appeal briefs as potential results that could be returned.

Next, the results could be pre-processed 102. In some embodiments, this could include performing optical character recognition as necessary (e.g., if the documents were originally downloaded as PDF images or in other similar formats). Additionally, in some embodiments, pre-processing 102 of office action responses and similar results may include identifying if any claims were canceled or withdrawn in that result (e.g., by checking if there was a claim amendment included and, if there was, examining the identifiers required by 47 CFR 1.121(c) to determine if any claims were canceled or withdrawn). Pre-processing 102 may also (or alternatively) include determining information such as the name and/or registration number of the attorney who signed the result, the date of the result, and other similar information that could be used to describe the document and/or its source.

When a process such as shown in FIG. 1 is applied in the context of patent prosecution, the identification of preceding related communications 103 could, in some embodiments, be performed simply by treating the office action that the potential result was responding to as the preceding related communication, thereby taking advantage of the structured nature of communications on patent applications. Similarly, in some embodiments, identification 104 of subsequent related communications could be performed by identifying the next substantive action following the potential result (e.g., the following office action, notice of allowance, notice of abandonment, or pre-appeal brief decision) on the same underlying application as the related subsequent communication.

Whether the subsequent communication should be treated as vetting the result could then be determined 105 by comparing the treatment of the claims in the preceding related communication and the claims in the subsequent communication. For example, in a case where the preceding communication is an office action that included a rejection of claim 1 under 35 U.S.C. § 101, while the subsequent communication was an office action that did not include such a rejection, then the result could be treated as successfully overcoming that rejection and therefore as having been vetted with respect to 35 U.S.C. § 101. Preferably, this type of determination will also account for the treatment of the claims in the potential result. For example, in a case where a claim is rejected in a preceding office action and not rejected in the following action, a system implemented based on this disclosure will preferably verify that the claim was still pending (e.g., by checking that the application was not amended to withdraw or cancel the claim) before treating the potential result as having been vetted with respect to the rejection that was not preserved between the preceding and subsequent office actions.

Figure 3:
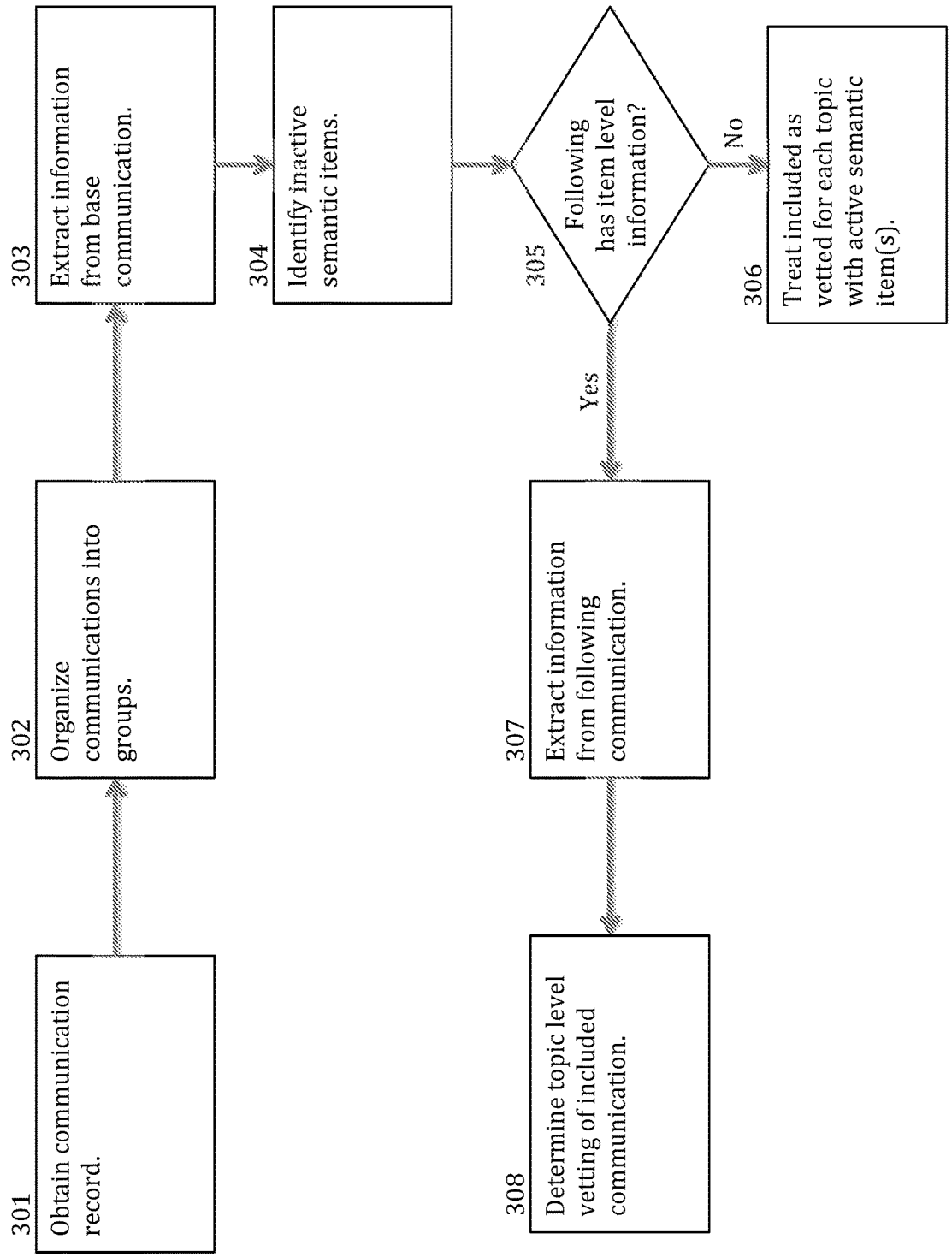
FIG. 3 depicts a process that can be used to determine whether documents should be treated as having been vetted.

To further illustrate how aspects of the disclosed technology could potentially be applied to analyzing documents generated in the context of patent prosecution, consider FIG. 3, which illustrates a process that can be used to determine whether documents filed during prosecution of a particular application should be treated as having been vetted for purposes of providing guidance during prosecution of other applications. Initially, in the process of FIG. 3, the communication record (e.g., an image file wrapper) of the application in question could be obtained 301 and pre-processed (e.g., relevant documents subjected to optical character recognition) as necessary. Next, the communications would be organized 302 into groups. This could be done, for example, using a process such as shown in FIG. 4.

Figure 4:
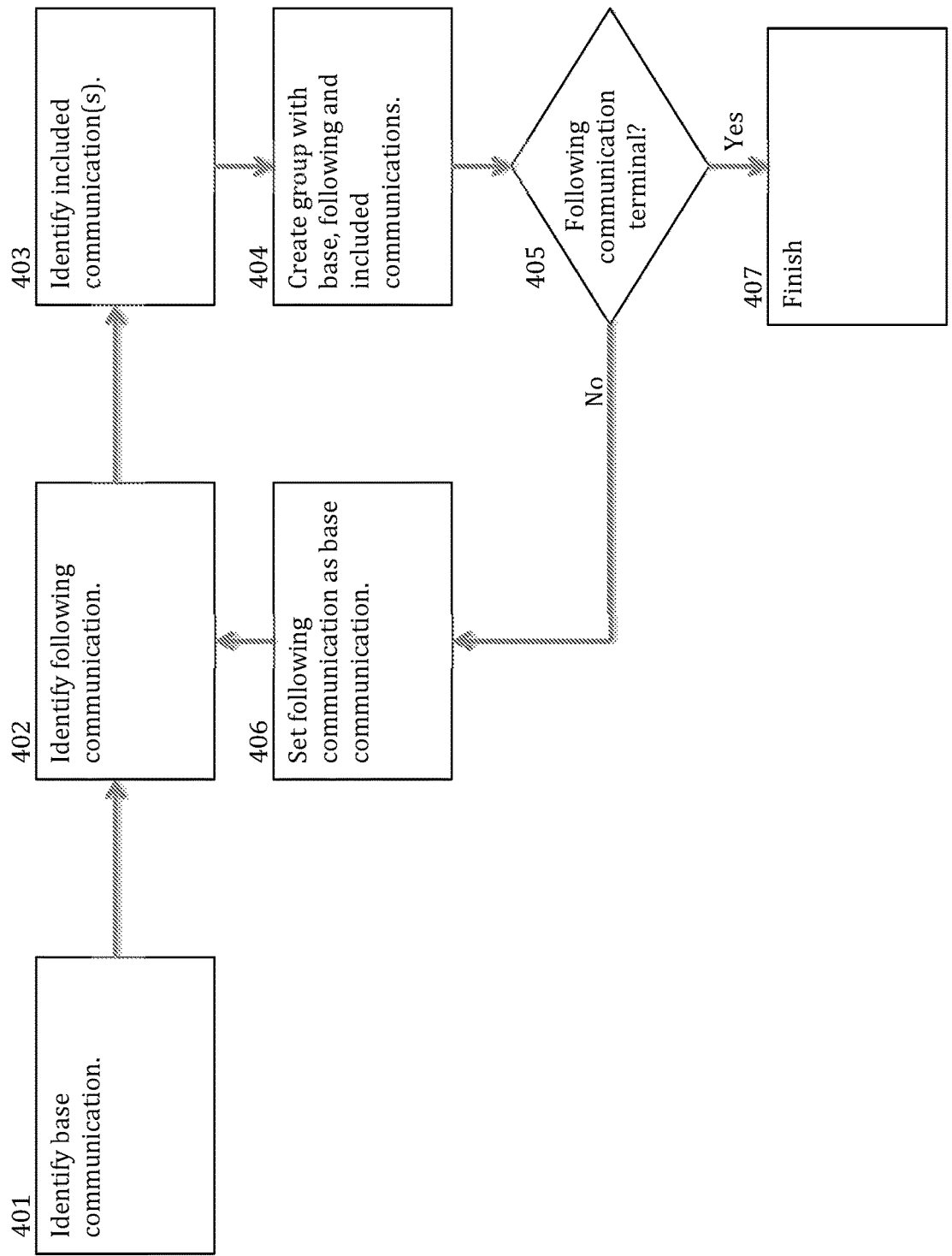
FIG. 4 depicts a process that can be used for grouping communications.

As shown in FIG. 4 a grouping process can begin with identifying 401 a base communication. This communication can be used to delimit a group, and on the first iteration of a process such as shown in FIG. 4 will preferably be the first action on the merits for the case. In various embodiments, the identification 401 of the base communication could potentially be done in a variety of ways. For example, in situations where communications are organized chronologically (e.g., in the case of a PDF image file wrapper made up of individual papers concatenated and bookmarked in order of mailing date) with different codes used to identify different types of communications (e.g., CTNF for a non-final office action) a first action on the merits could simply be identified by finding the earliest communication having the appropriate document code. In other cases, communications may be obtained 301 in a form that is not inherently chronologically ordered (e.g., a set of individual files), identifying a first action on the merits may include initially sorting the communications by date. Similarly, in cases where communications are not identified by document codes, identifying 401 the base communication may comprise searching the documents in chronological order for the earliest document that includes keywords and/or phrases (e.g., statutory citations, MPEP form paragraphs) identifying a rejection. Combined approaches may also be used. For example, in some embodiments, a document may be putatively identified as the first action on the merits based on a document code and this may be confirmed through analysis of that document's actual content (e.g., using keywords and/or phrases). Accordingly, the above description of identification 401 of the base communication should be understood as being illustrative only, and should not be treated as limiting.

Continuing with the discussion of FIG. 4, after the base communication has been identified 401, a following communication can be identified 402. In some embodiments, this could be done using techniques similar to those described above (e.g., using document codes, MPEP citations, etc.) to identify the next substantive communication from the patent office (e.g., an office action containing a rejection or a notice of allowance) following the base communication. Then, once the following communication had been identified 402, one or more included communications between the base and following communications could be identified 403. In some embodiments, these included communications could be communications that could be used as examples during prosecution of other applications, such as office action responses, appeal briefs or pre-appeal briefs. Despite the fact that these included communications would preferably be from sources other than the sources of the base and following communications (e.g., from attorneys representing patent applicants rather than from the patent office), in some embodiments they could be identified using techniques similar to those described previously for identifying the base and following communications. For example, in some embodiments, document codes of documents appearing chronologically between the base and following communications could be scanned and those with codes matching substantive filings by patent applicants (e.g., REM, CLM, etc.) could be identified 403 as included communications. A group could then be created 404 (e.g., a data structure identifying the documents in the group could be stored in memory of a computer performing a process such as shown in FIG. 4) with the base, following and included communications that had previously been identified.

In a process such as shown in FIG. 4, once a group had been created 404 a check 405 could be performed of whether the following communication was terminal—i.e., was the final communication in the group of documents (e.g., file wrapper) being processed that could be treated as a base or following communication. As with the other steps of FIG. 4, this type of determination 405 could be performed in different manners in different embodiments. For example, in some embodiments, if the following communication had a document code indicating conclusion of prosecution (e.g., NOA) it could be treated as being terminal. In other embodiments, rather than reviewing document codes for the following communication of the most recently created group, the determination 405 of whether that following communication is terminal could be made by simply checking if there were any subsequent communications that could be treated as either a base or following communication and, if there were not, treating the following communication from the most recently created group as a terminal communication.

However the determination 405 of whether the following communication is a terminal communication is made, if the following communication of the most recently created group is not a terminal communication, then the process of FIG. 4 can proceed to define another group, in which the following communication of the most recently created group would be set 406 as the base communication. Alternatively, if the following communication is determined 405 to be terminal, then the grouping process can finish 407 (e.g., a subroutine used for grouping could exit, returning execution to a larger program performing a process such as shown in FIG. 3).

Figure 5:
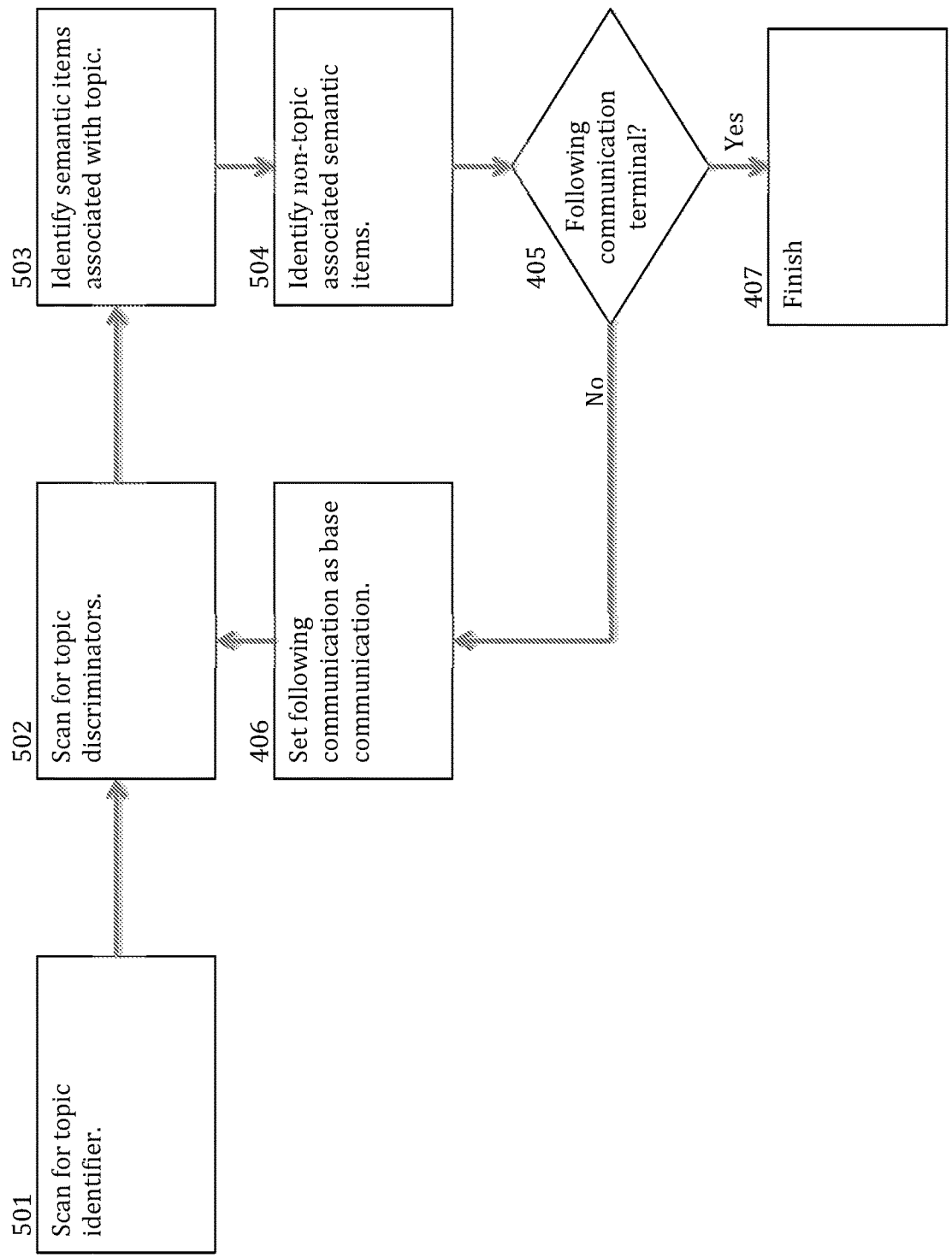
FIG. 5 depicts a process that can be used for extracting information from a communication.

Returning now to the discussion of FIG. 3, after the groups have been identified, they can be processed, which processing may begin with extracting 303 information from the base communication. This information can be extracted in various manners. For example, in some embodiments this type of extraction may be performed using techniques such as described in U.S. patent application Ser. No. 14/444,413 for Patent Prosecution Technology filed on Jul. 28, 2017, the disclosure of which is hereby incorporated by reference in its entirety. It is also possible that such extraction may proceed using a process such as shown in FIG. 5. Initially, in the process of FIG. 5, the base communication (e.g., a non-final office action comprising one or more rejections) would be scanned 501 for topic identifiers, such as statutory citations identifying particular types of rejections (e.g., 35 U.S.C. § 101, 35 U.S.C. § 102) or key words or phrases (e.g., "double patenting"). Next, once a topic identifier had been found, the text following that identifier could be scanned 502 for topic discriminators. For example, if a statutory citation such as 35 U.S.C. § 112 or 35 U.S.C. § 103 is identified, then, in some embodiments, a computer performing a process such as shown in FIG. 5 could be configured search for text that would discriminate between different types of rejections under those sections (e.g., keywords and phrases like "indefinite" or "best mode" in combination with "conceal" to discriminate between rejections under 35 U.S.C. § 112, or prior art citations like patent or published patent application numbers to discriminate between rejections under 35 U.S.C. § 103).

A process such as shown in FIG. 5 could also include identifying 503 semantic items associated with the previously identified (and, as necessary, discriminated) topic. For example, in some embodiments, a computer performing a process such as shown in FIG. 5 could search for a word like "claim" or "claims" followed by one or more numbers, and then treat each claim identified between the most recent topic discriminator and the next topic or topic discriminator as a semantic item associated with the topic. These steps could then be repeated until all of the rejections in the office action had been identified and all of the claims rejected in that office action had been associated with a rejection. For example, in some embodiments, when a computer is identifying 503 claims associated with a type of rejection and runs across a statutory citation for a different type of rejection (e.g., encounters the string "35 U.S.C. § 103" while identifying claims to associate with a rejection under 35 U.S.C. § 101), it could return to the preceding step of scanning for topic discriminators 502 to determine the type of rejection that the next claim(s) it identifies 503 should be associated with.

In addition to identifying 503 semantic items associated with topics, in some embodiments processing of a base communication may also include identification 504 of semantic items that are not associated with any topic. For example, when a computer is processing an office action, this could include searching the conclusion of the office action for language identifying the examiner and his or her supervisor, potentially in combination with related information such as the examiner's (and/or his or her supervisor's) telephone number, and could then extract this information as non-topic associated semantic items. Similarly, in some embodiments, the header and/or first page of an office action may be scanned for numbers proximate the phrase "Art Unit" in order to identify the art unit in which the application whose file history was being analyzed was classified.

Of course, variations on the processing of base communications are possible, and could be implemented in various embodiments. For example, in some embodiments, information retrieved using a process such as shown in FIG. 5 could be sanitized and/or augmented with other information that had been gathered previously. To illustrate, consider the identification of an examiner and his or her supervisor as non-topic associated semantic items. In some embodiments, when an examiner and/or his or her supervisor were identified, that identification may be checked against a database of known correct identifications (e.g., as could be obtained from the patent office employee locator, available at https://portal.uspto.gov/EmployeeSearch/), with fuzzy logic being used to identify the record in the database that matched most closely against the supervisor and/or examiner identified in the office action. In this way, an examiner/supervisor could potentially be accurately identified even in cases where information from the office action was incomplete and/or inaccurate (e.g., as a result of OCR errors).

Continuing with the discussion of FIG. 3, after the extraction 303 of information from the base communication, the included communication (e.g., an office action response responding to the first office action) could be scanned to identify 304 inactive semantic items. For example, in some embodiments, this could be done by checking if the group included a claim amendment (e.g., as shown by the presence of a file with the "CLM" document type) and, if it did, reading through that amendment to identify claims or claim sequences followed by status identifiers indicating those claims were no longer being examined (e.g., "Cancelled," "Withdrawn").

Following identification 304 of inactive semantic items, a process such as shown in FIG. 3 could continue with determining 305 whether the following communication in the group being analyzed included item level information. For example, in some embodiments, a computer programmed to analyze patent application file wrappers using a process such as shown in FIG. 3 could make this determination 305 by checking if the following communication in the group being analyzed was a notice of allowance (which would simply allow all then pending claims) or a second rejection (which would identify rejections applied to particular claims). If the following communication did not include item level information (e.g., if it was a notice of allowance), then the included communication could be treated 306 as having been vetted for each topic in the base communication where there was at least one active semantic item as of the following communication (e.g., if a first office action included a rejection of claim 1 as indefinite, and this office action was followed by a notice of allowance, the response to the first office action could be treated as having been vetted for responding to indefiniteness rejections so long as it didn't include an amendment canceling claim 1).

Alternatively, in the event that the following communication did include item level information, the following communication could be subjected to an information extraction 307 process such as described previously for extracting 303 information from the base communication. The information obtained in these two information extraction steps 303 307 could then be used 308 to determine what (if any) topics the included communication should be treated as having been vetted for. An example of a process that could be used to perform this determination is provided in FIG. 6.

Figure 6:
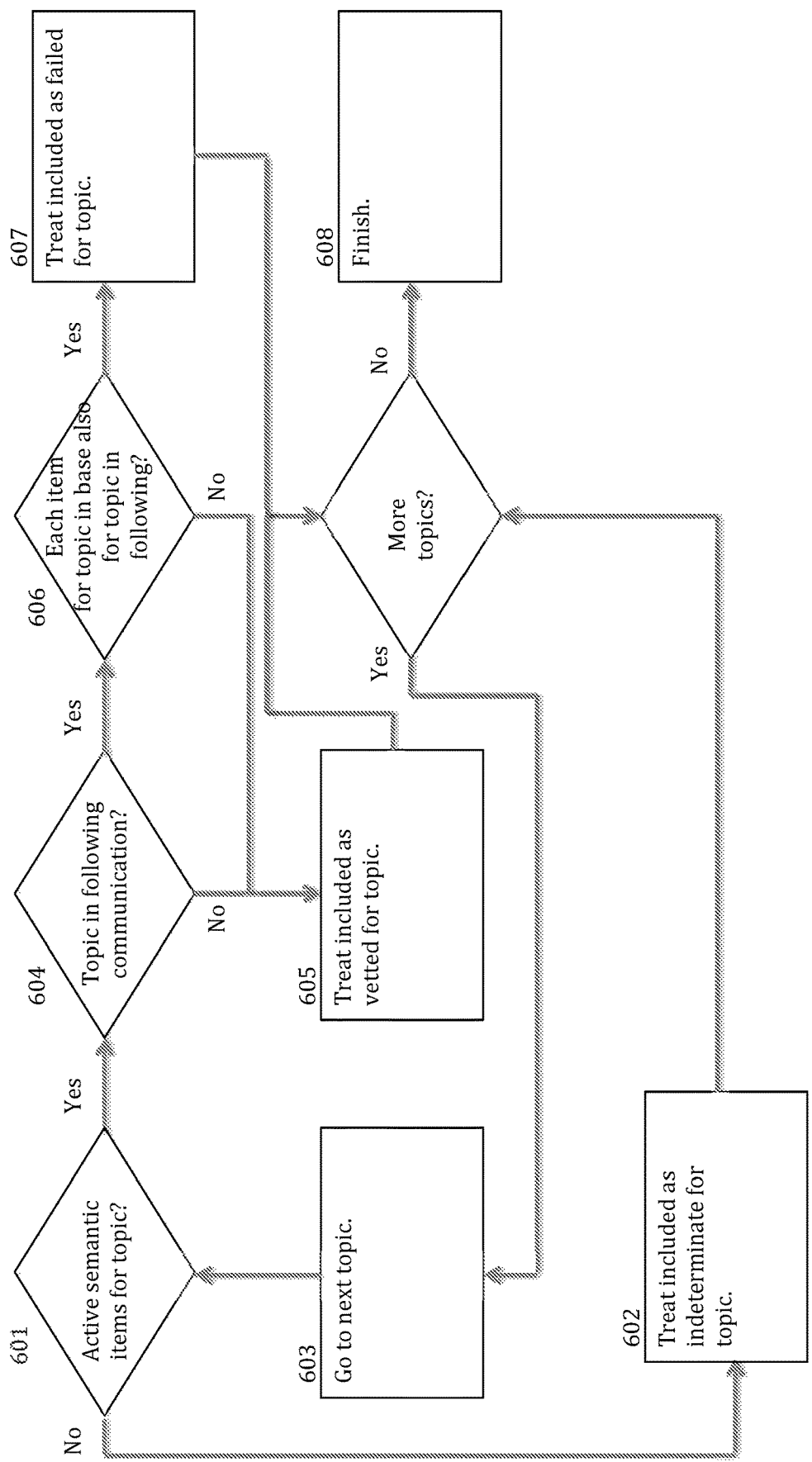

Initially, in a process such as shown in FIG. 6, a check 601 could be made of whether, for an initial topic from the base communication, any of the semantic items associated with that topic in the base communication were still active in the following communication. For example, in a case where the base communication is an office action which includes rejections of claims 1, 2 and 3 under 35 U.S.C. § 101, if the initial topic was 35 U.S.C. § 101 rejections, this check 601 could be performed by determining if any of claim 1, 2 or 3 were still pending as of the date of the following communication. If none of the claims associated with that rejection was still pending in the following communication (e.g., because they had all been cancelled), then the included communication could be treated 602 as indeterminate for the initial topic, and if there were more topics, the process of FIG. 6 could move 603 to the next topic (e.g., increment a topic counter) and continue.

Alternatively, if any of the semantic items associated with the topic were still pending in the following communication, a check 604 could be made as to whether that topic was also present in the following communication. If that topic was not present in the following communication, then the included communication could be deemed 605 to have been vetted for that topic. If that topic was present in the following communication, a further check 606 could be made of whether each semantic item associated with that topic in the base communication that was pending at the time of the following communication was also associated with that topic in the following communication (e.g., for the ground of rejection from the base communication that was treated as the initial topic, if every claim rejected based on that ground of rejection in the base communication that was pending in the following communication was also rejected based on that ground of rejection in the following communication). If this check 606 revealed that each of the pending semantic items associated with the topic in the base communication was also associated with that topic in the following communication, a process such as shown in FIG. 6 could treat 607 the included communication as failing for that topic (e.g., because none of the rejections based on that ground of rejection from the base communication had been overcome). If this check 606 revealed that at least one pending semantic item associated with the topic in the base communication was not associated with the topic in the following communication, then the included communication could be treated 605 as having been vetted for that topic (e.g., because that ground of rejection was overcome for at least one claim to which it was applied in the base communication). In either case, after the included communication was treated as either successful or failed for the topic under analysis, the process could repeat for the next topic from the base communication or, if there was no such topic, could conclude 608.

Of course, it should be understood that, while FIG. 3 and the associated discussion illustrated how aspects of the disclosed technology could potentially be applied to analyzing documents generated in the context of patent prosecution, FIG. 3 is not intended to be an exhaustive discussion of that topic, and variations on the process of FIG. 3 and the associated disclosure set forth above could be implemented in some embodiments. For example, in some embodiments, rather than simply scanning 304 an included communication to determine inactive semantic items, such a communication could also be scanned to identify other data, such as the name and/or registration number of the attorney who signed the communication.

As another example, consider the steps discussed in the context of FIG. 6 of determining 604 whether a topic from a base communication was present in a following communication and treating 605 an included communication as vetted for that topic when it was not. In different embodiments, these steps may treat topics at different levels of granularity. For example, in some embodiments, if a base communication includes a rejection under 35 U.S.C. § 102, then if there were any rejections under 35 U.S.C. § 102 in the following communication then the topic of rejections under 35 U.S.C. § 102 could be treated as present and the determination of whether the included communication should be treated as having been vetted as successful for that topic could be deferred until the treatment of the individual claims had been evaluated 606. Alternatively, in some embodiments, if a base communication included a rejection under 35 U.S.C. § 102 based on reference X but the following communication included only rejections under 35 U.S.C. § 102 based on reference Y, then the included communication could be treated as vetted as being successful for overcoming rejections under 35 U.S.C. § 102 based on reference X, even though there were rejections under 35 U.S.C. § 102 in the following communication. Indeed, it is also possible that, for some embodiments, topics may be treated at different levels of generality when considered for different purposes. For example, in some embodiments, if a base communication included rejections under 35 U.S.C. § 102 based on reference X, and a following communication included only rejections under 35 U.S.C. § 102 based on reference Y, the included communication could be treated as having been vetted as successful for overcoming rejections under 35 U.S.C. § 102 even though there were rejections under 35 U.S.C. § 102 in the following communication.

Other types of variations are possible, and could be implemented in different embodiments when aspects of the disclosed technology are applied in the context of patent prosecution. For example, in some embodiments, a response may be treated as being vetted as successful in overcoming a type of rejection only if all rejections of that type from the base communication were absent from the following communication. Similarly, in some embodiments, an ontology of related rejection types may be provided, and a response may be treated as being only partially successful in overcoming a type of rejection if the rejection was replaced with a related rejection in the subsequent action (e.g., if a rejection based on anticipation was replaced with a rejection based on obviousness, or if a rejection based on lack of written description or enablement was replaced with a rejection based on new matter). Accordingly, the above description should be understood as being illustrative only, and should not be treated as limiting.

Once processes such as described above had identified a corpus of office actions and/or similar documents that should be treated as having been vetted with respect to various types of rejections, that corpus could be used to support systems for improving prosecution practices in ways that are similar to those described previously for minimizing the impact of fake news or similar manipulation. For example, some systems implemented to use the disclosed technology in the patent prosecution context could allow a user to upload a communication from the patent office (e.g., an office action) and then present the user with results comprising office action responses, appeal briefs or other communications that had been vetted as overcoming rejections matching those from the uploaded communication. Similarly, just as some systems may be configured to identify articles regarding controversial political issues as having been refuted, some implementations applying aspects of this disclosure to the patent prosecution may identify potential results as failing to overcome a rejection (e.g., if a rejection was present in both the preceding and following office actions) and then allow a user to take advantage of that information in his or her own practice (e.g., by allowing the user to see responses that had not overcome particular types of rejections).

Filtering practices such as described above in the context of minimizing fake news or similar manipulation may also be applied in the context of improving patent prosecution practices. For example, in some embodiments, a user of a system that applies aspects of this disclosure to patent prosecution may be able to filter results based on factors such as:

author of result (e.g., attorney who signed office action response or other result);

source of result (e.g., law firm with which the attorney who signed the result is affiliated, assignee of the application associated with a result);

author of subsequent and/or preceding related communication (e.g., examiner on following office action);

source of subsequent and/or preceding related communication (e.g., art unit, technology class, and/or work group for the application from which the result was drawn);

text in the following and/or preceding communication (e.g., only show results whose preceding related communications and/or following related communications included specific user defined strings, or matched specific user defined search parameters, which parameters or strings may, in some embodiments, be provided separately for the preceding and related communications);

text in result;

topic of result (e.g., if the uploaded document included arguments on multiple topics, select a specific one of those topics and ensure that all results responded to preceding related communications that also addressed that topic);

date of preceding and/or following related communication;

date of result;

related material for result (e.g., only include results that were accompanied by petitions and/or declarations); and/or whether the result was vetted, refuted, or the user doesn't care.

Other variations and/or applications are also possible, and, in light of this disclosure, will be immediately apparent to, and implementable without undue experimentation by, those of ordinary skill in the art. For example, in some embodiments, if a user uploads a document that comprises multiple topics, he or she may be presented with an interface that allows him or her to specify multiple topics that should be present in a preceding related communication (e.g., using check boxes), and may also be able to specify, for each of those topics, whether he or she wanted to see results whose arguments were successful on those topics, were unsuccessful on those topics, or whether the user didn't care about the result of the arguments presented on those topics. Similarly, while some embodiments applying aspects of the disclosed technology in the patent prosecution context would require a user to upload an office action to find results that had responded to arguments similar to those set forth in that office action, this may not be a requirement in all cases. For example, in some cases, a user could be presented with an interface that would allow him or her to specify parameters such as those described above that results should satisfy, and could be presented with a list of office action responses and similar documents matching those parameters without having to first upload an input document of his or her own. For instance, in some embodiments, a user could be allowed to specify that they wanted to see office action responses that responded to office actions including a specified search string and that themselves included a specified search string, and that overcame a certain type of rejection, and could be provided with a list of responses meeting those criteria (assuming any were available in the database used by that embodiment) even without first providing an input document such as was described in the context of a process such as shown in FIG. 3. Accordingly, the examples given above should be understood as being illustrative only, and should not be treated as implying limits on the protection provided by this document or any related document.

In light of the potential for variations on the material explicitly disclosed herein, instead of limiting the protection accorded by this document, or by any related document, to the material explicitly described herein, the protection accorded by this document should be understood to be defined by the following claims, which are drafted to reflect the scope of sought when the terms in those claims which are listed below under the label "Explicit Definitions" are given the explicit definitions set forth herein, and the remaining terms are given their broadest reasonable interpretation as shown by a general purpose dictionary. To the extent that the interpretation which would be given to the claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary should control, and the inconsistent usage of terms in above description should have no effect.

Explicit Definitions

When used in the claims, "based on" should be understood to mean that something is determined at least in part by the thing that it is indicated as being "based on." For a claim to indicate that something must be completely determined based on something else, it will be described as being "based EXCLUSIVELY on" whatever it is completely determined by.

When used in the claims, "computer" should be understood to refer to a device or group of devices for storing and processing data, typically using a processor and computer readable medium. In the claims, the word "server" should be understood as being a synonym for "computer," and the use of different words should be understood as intended to improve the readability of the claims, and not to imply that a "server" is not a "computer."

When used in the claims "computer readable medium" should be understood to mean any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. A reference to a "computer readable medium" being "non-transitory" should be understood as being synonymous with a statement that the "computer readable medium" is "tangible", and should be understood as excluding intangible transmission media, such as a vacuum through which a transient electromagnetic carrier could be transmitted. Examples of "tangible" or "non-transitory" "computer readable media" include random access memory (RAM), read only memory (ROM), hard drives and flash drives.

When used in the claims, "configure" should be understood to mean designing, adapting, or modifying a thing for a specific purpose. When used in the context of computers, "configuring" a computer will generally refer to providing that computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "data" should be understood to refer to information represented in a form which is capable of being processed, stored and/or transmitted.

When used in the claims, "processor" should be understood to refer to a device or group of devices which is capable of performing one or more logical and/or physical operations on data to produce a result.

When used in the claims, a "set" should be understood to refer to a number, group or combination of zero or more things of similar nature, design, or function.

Accordingly, I claim:
1. A system comprising:
   a) a database, the database storing a plurality of documents comprising:
      i) a first set of documents;
      ii) a second set of documents, wherein, for each document in the second set of documents, the first set of documents comprises a document for which that document from the second set of documents is identified as a subsequent related document; and
      iii) a third set of documents, the third set of documents comprising, for each document in the first set of documents, a document identified as a preceding related document for that document from the first set of documents;
      wherein, for each document in the second set of documents, that document is associated with a viewpoint that is:
         1) Consistent with a viewpoint associated with the document from the third set of documents identified as the preceding related communication for the document from the first set of documents for which that document from the second set of communications is identified as the subsequent related document; and
         2) contrasting with a viewpoint associated with the document from the first set of documents for which that document from the second set of documents is identified as the subsequent related document;
   b) a set of vetting values, wherein the set of vetting values comprises, for each document from the second set of documents, a vetting value for the document from the first set of documents for which that document from the second set of documents is identified as the subsequent related document; and
c) a non-transitory computer readable medium storing instructions to respond to a query by determining, based on the set of vetting values, a search result set comprising documents from the first set of documents, wherein the search result set does not comprise any documents from the second set of documents or the third set of documents;

wherein the non-transitory computer readable medium stores instructions to generate the set of vetting values based on, for each document from the second set of documents:
A) a set of semantic items corresponding to that document; and
B) a set of semantic items corresponding to the document from the third set of documents identified as the preceding related document for the document from the first set of documents for which that document from the second set of documents is identified as the subsequent related document;

wherein:
I) the non-transitory computer readable medium further stores instructions to:
  A) for each document from the second set of documents, identify the set of semantic items for that document by performing steps comprising identifying a set of topics for that document;
  B) for each document from the third set of documents, identify the set of semantic items for that document by performing steps comprising identifying a set of topics for that document;
  C) receive a specialized topic; and
  D) determine the search result set to only include documents for which the set of topics for the document identified as the preceding related document includes the specified topic;
II) the set of vetting values indicates, for each document from the result set, that that document has been vetted for the specified topic based on a treatment of the specified topic differing between:
  A) the document identified as the preceding related document for that document from the result set; and
  B) the document identified as the subsequent related document for that document from the result set.

2. The system of claim 1, wherein, for each document from the second set of documents:
a) that document from the second set of documents;
b) the document from the first set of documents for which that document from the second set of documents is identified as the subsequent related document; and
c) the document from the third set of documents identified as the preceding related document for the document from the first set of documents for which that document from the second set of documents is identified as the subsequent related document;
are all part of a single communication stream.

3. The system of claim 2, wherein, for each document from the second set of documents:
a) that document from the second set of documents responds to the document from the first set of documents for which that document from the second set of documents is identified as the subsequent related document;
b) the document from the first set of documents for which that document from the second set of documents is identified as the subsequent related document responds to the document from the third set of documents identified as the preceding related document for the document from the first set of documents for which that document from the second set of documents is identified as the subsequent related document.

4. The system of claim 1, wherein:
a) the non-transitory computer readable medium stores instructions to determine the query based on an input document associated with an input document viewpoint; and
b) the instructions stored on the non-transitory computer readable medium to respond to the query by determining the search result set are configured to determine the search result set such that, for each document in the search result set comprised by the first set of documents, the viewpoint associated with that document contrasts with the input document viewpoint.

5. The system of claim 1, wherein the non-transitory computer readable medium stores instructions to define the specified topic based on:
a) a user uploading a input document via a user interface; and
b) identifying the specified topic as a topic for the input document.

6. The system of claim 1, wherein the non-transitory computer readable medium stores instructions to present a search result interface, wherein:
a) the search result interface is operable by a user to access one or more documents from the search result set; and
b) for each document from the search result set accessible by the user via the search result interface, the search result interface makes documents identified as related documents for that document from the search result set accessible by the user.

7. The system of claim 6, wherein the search result interface makes documents identified as related documents accessible by the user by:
a) providing, for each document from the search result set accessible by the user via the search result interface, a link to a list of related documents for that document from the search result set; and
b) responding to activation of the link to the list of related documents for a document from the search result set by providing a page comprising links to the documents identified as related documents for that document from the search result set.

8. A method comprising:
a) storing, in a database, a plurality of documents, the plurality of documents comprising:
  i) a first set of documents;
  ii) a second set of documents, wherein, for each document in the second set of documents, the first set of documents comprises a document for which that document from the second set of documents is identified as a subsequent related document; and
  iii) a third set of documents, the third set of documents comprising, for each document in the first set of documents, a document identified as a preceding related document for that document from the first set of documents;
wherein, for each document in the second set of documents, that document is associated with a viewpoint that is:
  1) Consistent with a viewpoint associated with the document from the third set of documents identified as the preceding related communication for the document from the first set of documents for which that document from the second set of communications is identified as the subsequent related document; and
   2) contrasting with a viewpoint associated with the document from the first set of documents for which that document from the second set of documents is identified as the subsequent related document;
  b) generating a set of vetting values, wherein the set of vetting values comprises, for each document from the second set of documents, a vetting value for the document from the first set of documents for which that document from the second set of documents is identified as the subsequent related document; and
  c) responding to a query by determining, based on the set of vetting values, a search result set comprising documents from the first set of documents, wherein the search result set does not comprise any documents from the second set of documents or the third set of documents;
wherein the set of vetting values is generated based on, for each document from the second set of documents:
A) a set of semantic items corresponding to that document; and
B) a set of semantic items corresponding to the document from the third set of documents identified as the preceding related document for the document from the first set of documents for which that document from the second set of documents is identified as the subsequent related document;
wherein:
I) the method further comprises:
  A) for each document from the second set of documents, identifying the set of semantic items for that document by performing steps comprising identifying a set of topics for that document;
  B) for each document from the third set of documents, identifying the set of semantic items for that document by performing steps comprising identifying a set of topics for that document;
  C) receiving a specified topic; and
  D) determining the search result set to only include documents for which the set of topics for the document identified as the preceding related document includes the specified topic;
II) the set of vetting values indicates, for each document from the result set, that that document has been vetted for the specified topic based on a treatment of the specified topic differing between:
  A) the document identified as the preceding related document for that document from the result set; and
  B) the document identified as the subsequent related document for that document from the result set.

9. The method of claim 8, wherein, for each document from the second set of documents:
  a) that document from the second set of documents;
  b) the document from the first set of documents for which that document from the second set of documents is identified as the subsequent related document; and
  c) the document from the third set of documents identified as the preceding related document for the document from the first set of documents for which that document from the second set of documents is identified as the subsequent related document;
are all part of a single communication stream.

10. The method of claim 9, wherein, for each document from the second set of documents:
  a) that document from the second set of documents responds to the document from the first set of documents for which that document from the second set of documents is identified as the subsequent related document;
  b) the document from the first set of documents for which that document from the second set of documents is identified as the subsequent related document responds to the document from the third set of documents identified as the preceding related document for the document from the first set of documents for which that document from the second set of documents is identified as the subsequent related document.

11. The method of claim 8, wherein:
  a) the method comprises determining the query based on an input document associated with an input document viewpoint; and
  b) the search result set is determined such that, for each document in the search result set comprised by the first set of documents, the viewpoint associated with that document contrasts with the input document viewpoint.

12. The method of claim 8, wherein the method comprises defining the specified topic based on:
  a) a user uploading a input document via a user interface; and
  b) identifying the specified topic as a topic for the input document.

13. The method of claim 8, wherein the method comprises executing instructions to present a search result interface, wherein:
  a) the search result interface is operable by a user to access one or more documents from the search result set; and
  b) for each document from the search result set accessible by the user via the search result interface, the search result interface makes documents identified as related documents for that document from the search result set accessible by the user.

14. The method of claim 13, wherein the search result interface makes documents identified as related documents accessible by the user by:
  a) providing, for each document from the search result set accessible by the user via the search result interface, a link to a list of related documents for that document from the search result set; and
  b) responding to activation of the link to the list of related documents for a document from the search result set by providing a page comprising links to the documents identified as related documents for that document from the search result set.

\* \* \* \* \*